Jan. 15, 1924.　　　　　　　　　　　　　　　　1,480,725
E. ISRAEL
WHEEL CHOCK
Filed Feb. 3, 1922
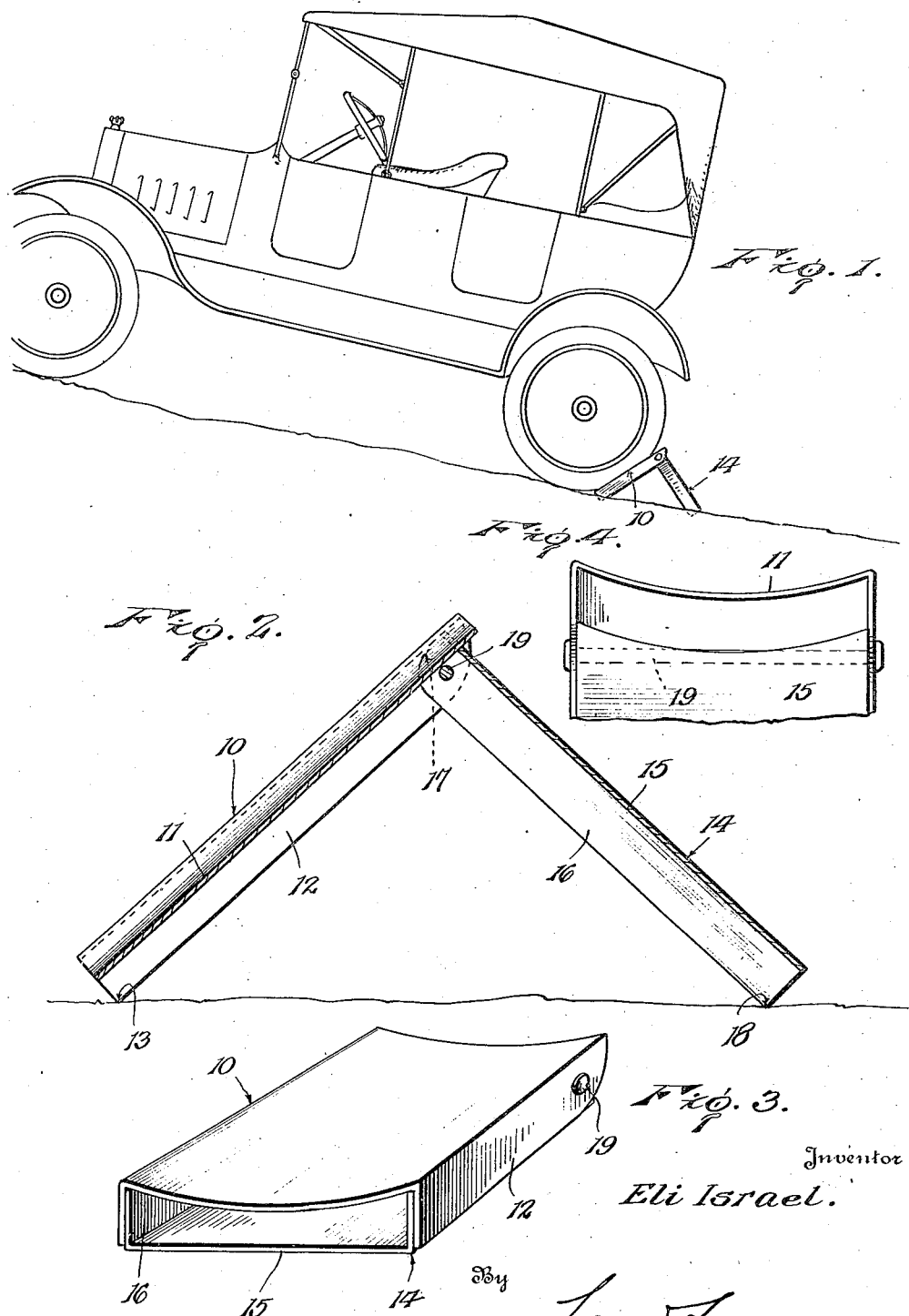

Patented Jan. 15, 1924.

1,480,725

UNITED STATES PATENT OFFICE.

ELI ISRAEL, OF WILKES-BARRE, PENNSYLVANIA.

WHEEL CHOCK.

Application filed February 3, 1922. Serial No. 533,873.

*To all whom it may concern:*

Be it known that I, ELI ISRAEL, citizen of the United States, residing at Wilkes-Barre, in the county of Luzerne and State of Pennsylvania, have invented certain new and useful Improvements in Wheel Chocks, of which the following is a specification.

This invention relates to an improved wheel chock particularly designed for use in connection with motor vehicles and seeks, as one of its principal objects, to provide a simple and efficient device of this character which may be readily arranged to engage one of the wheels of a motor vehicle to prevent movement of the vehicle.

A further object of the invention is to provide a device so constructed that slipping of the device will be prevented.

And the invention has as a still further object to provide a device which will be light in weight and which may be compactly folded so that the device may be readily carried beneath one of the seats of the vehicle.

Other and incidental objects will appear hereinafter.

In the drawing:

Figure 1 is a side elevation showing my improved device in use.

Figure 2 is a vertical sectional view taken medially through the device.

Figure 3 is a perspective view showing the device folded, and

Figure 4 is a fragmentary rear elevation of the device.

Referring now more particularly to the drawing, it will be seen that my improved chock comprises a channel shaped body member 10. This member is preferably formed from a single piece of suitable resilient sheet metal and includes a body wall 11 from which depend side walls 12 extending from end to end of the member. The body wall is transversely bowed or dished to accommodate a wheel tire while the side walls are formed with squared lower corners to provide piercing points 13. At their upper ends, the side walls are preferably formed with rounded corners to eliminate sharp edges. Swingingly connected to the body prop member is a channel shaped prop member 14 which, like the body member, is also formed from a single piece of suitable resilient sheet metal and comprises a flat body wall 15 from which depend side walls 16 extending from end to end of the member.

The side walls are formed with rounded upper corners but provide straight terminal shoulders 17 while at its adjacent end the body wall 15 is provided with a concave end edge to fit and brace the bowed body wall 11 of the member 10. At their lower ends, the walls 16 are formed with square corners to provide piercing points 18 and extending through the walls 12 and 16, near the upper ends thereof, is a bolt 19 swingingly connecting the members.

In use, the lower ends of the members 10 and 14 are swung apart until the shoulders 17 at the upper ends of the side walls 16 of the member 14 abut the body wall 11 of the member 10, when the member 14 will rigidly support the member 10 in inclined position so that, as illustrated in Figure 1, the device may be arranged behind one of the wheels of a motor vehicle for supporting the vehicle against rearward movement. As is well known, trouble is often experienced by movement of a vehicle while jacking up one of the wheels thereof and, as will be seen, the present invention will provide a very convenient device whereby movement of the vehicle will be prevented under such circumstances. Should the vehicle start to move, pressure of the vehicle wheel against the member 10 of the device will serve to sink the piercing points 13 and 18 of the members 10 and 14 into the ground so that the device will be securely held against slipping. When not in use, the member 14 is, as shown in Figure 3, folded into the member 10 so that the device may thus be conveniently carried beneath one of the seats of the vehicle. Furthermore, as will be perceived in view of the foregoing, the device is very light in weight and may accordingly be readily manipulated.

Having thus described the invention, what is claimed as new is:

1. A wheel chock including pivotally connected channel-shaped members each open at one side and movable into divergent relation locked against each other, the members being foldable into nested relation each closed at its open side by the other.

2. A wheel chock including pivotally connected channel-shaped members having spaced side walls respectively and movable into divergent relation locked against each other, the members being foldable to lie one within the other frictionally held by the engagement of the side walls of one with the side walls of the other.

3. A wheel chock including companion channel-shaped members having side walls, and means pivotally connecting the members near the upper ends of said walls for movement into divergent relation locked against each other and having the lower ends of said side walls presented for engagement with the ground holding the device against slipping.

4. A wheel chock including companion channel-shaped members each having a body wall and spaced side walls, and means pivotally connecting said members near their upper ends for movement to divergent position having the body wall of one abutting at its upper edge beneath the body wall of the other limiting the members in divergent position and bracing the body wall of the latter member.

5. In a wheel chock, the combination of a pair of sheet metal channel members of rectangular shape each having a body wall and spaced side walls, and means extending through said side walls pivotally connecting the members near corresponding ends thereof.

In testimony whereof I affix my signature.

ELI ISRAEL. [L. S.]